United States Patent
Nemeth et al.

(10) Patent No.: US 12,228,242 B1
(45) Date of Patent: Feb. 18, 2025

(54) HYDRACARBON DOZER VALVE BRACKET

(71) Applicant: FCA US LLC, Auburn Hills, MI (US)

(72) Inventors: Michael L Nemeth, Holly, MI (US); Kevin A Spangler, Lake Orion, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/449,132

(22) Filed: Aug. 14, 2023

(51) Int. Cl.
*F16M 13/02* (2006.01)
*F01N 3/20* (2006.01)

(52) U.S. Cl.
CPC .......... *F16M 13/02* (2013.01); *F01N 3/2066* (2013.01); *F01N 2610/1453* (2013.01)

(58) Field of Classification Search
CPC ... F16M 13/02; F01N 3/2066; F01N 13/1805; F01N 2610/1463
USPC ........................................................ 248/674
See application file for complete search history.

(56) References Cited

U.S. PATENT DOCUMENTS

| | | | |
|---|---|---|---|
| 7,624,956 B2 * | 12/2009 | Steigert | F01N 13/10 248/113 |
| 9,546,584 B2 | 1/2017 | Qi | |
| 10,125,723 B1 * | 11/2018 | Senofonte | F02K 1/822 |
| 11,555,437 B2 * | 1/2023 | Hogan | F01N 13/1844 |
| 11,952,929 B1 * | 4/2024 | Nemeth | F01N 13/1805 |
| 2012/0012731 A1 * | 1/2012 | Johnson | F01N 13/1822 248/638 |

* cited by examiner

Primary Examiner — Todd M Epps
(74) Attorney, Agent, or Firm — Jeremy J. Klobucar

(57) ABSTRACT

A dozer valve bracket has a first bracket portion to secure with a frame cross member. The first bracket portion includes a fastener receiver to enable passage of a fastener. A second bracket portion is spaced from the fastener receiver and extends substantially transverse to and from the first bracket portion. The second bracket portion has a valve retention member to position the valve at a desired angle on the second bracket portion. A heat shield is coupled with the second bracket portion to protect the valve from heat generated by an exhaust system. A flex line support positions the flex line away from the exhaust system.

14 Claims, 3 Drawing Sheets

HYDRACARBON DOZER VALVE BRACKET

FIELD

The present disclosure relates to passenger trucks that utilize diesel engines wherein the exhaust is required to be cleaned by injecting fuel from a dozer valve.

BACKGROUND

This section provides background information related to the present disclosure which is not necessarily prior art.

In diesel engine exhaust systems, it is required to utilize fluid injection by a dozer valve into the exhaust for cleaning purposes. The dozer valve may be positioned out of the way so that the fuel can be monitored and injected into the exhaust system to clean or remove soot every 24 hour period of drive time. However, due to the vehicle envelope, the packaging of the dozer valve becomes difficult in the given vehicles. Due to the exhaust components securement mechanisms, the valve cannot be positioned along a reinforcement rail due to the fact that the exhaust component is connected with other exhaust components. Thus, the dozer valve is in the way of the installation of the exhaust components. Thus, there is a need for the dozer valves to be positioned into the packaging envelope without prohibiting or hampering installation of the exhaust components with one another.

The present disclosure provides a dozer valve that is bolted directly to a transmission cross member. The dozer valve fits into the packaging envelope while enabling the exhaust components to be moved vertically onto the transmission cross member. The present disclosure provides a bracket with a heat shield to protect for aerothermal heat from the hot end of the exhaust. This also acts to protect the dozer valve itself from damage. The bracket also provides that the dozer valve is positioned at 15°, with respect to horizontal, so that the inlet is higher than the outlet. Also, the present bracket positions the dozer valve with respect to the exhaust so that a standard flex line may be utilized with the dozer valve. The bracket also provides holding of the flex line for prohibiting sagging of the flex line onto the hot exhaust pipe during operation. Also, the bracket provides for holding of low voltage wiring with respect to the dozer valve.

SUMMARY

This section provides a general summary of the disclosure, and is not a comprehensive disclosure of its full scope or all of its features.

According to a first aspect of the disclosure, a dozer valve bracket comprises a first bracket portion to secure the dozer bracket to a frame cross-member. The first bracket portion includes a receiver to enable fasteners passage to secure the bracket with the cross-member. A second bracket portion is spaced from the fastener receiver and extends substantially transverse to the first bracket portion. The second bracket portion includes a valve retention member to position the valve at a desired position or angle with respect to the second bracket portion. A heat shield is coupled with the second bracket portion to protect the valve from heat generated by an exhaust system. Also, a flex line support positions the flex line away from the exhaust system. During use, the first bracket portion is covered by the exhaust system. A wall portion defines the second bracket portion and the valve retention member. The heat shield is offset from the valve retention member. Likewise, the flex line support is offset from the valve retention member. A wiring support is coupled with the heat shield. A reinforcement member is positioned between the first and second bracket portions.

According to a second aspect of the disclosure, a dozer valve and bracket comprises a dozer valve bracket with a first bracket portion to secure the dozer bracket to a frame cross-member. The first bracket portion includes a receiver to enable fasteners passage to secure the bracket with the cross-member. A second bracket portion is spaced from the fastener receiver and extends substantially transverse to the first bracket portion. The second bracket portion includes a valve retention member to position the valve at a desired position or angle with respect to the second bracket portion. A heat shield is coupled with the second bracket portion to protect the valve from heat generated by an exhaust system. Also, a flex line support positions the flex line away from the exhaust system. During use, the first bracket portion is covered by the exhaust system. A wall portion defines the second bracket portion and the valve retention member. The heat shield is offset from the valve retention member. Likewise, the flex line support is offset from the valve retention member. A wiring support is coupled with the heat shield. A reinforcement member is positioned between the first and second bracket portions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
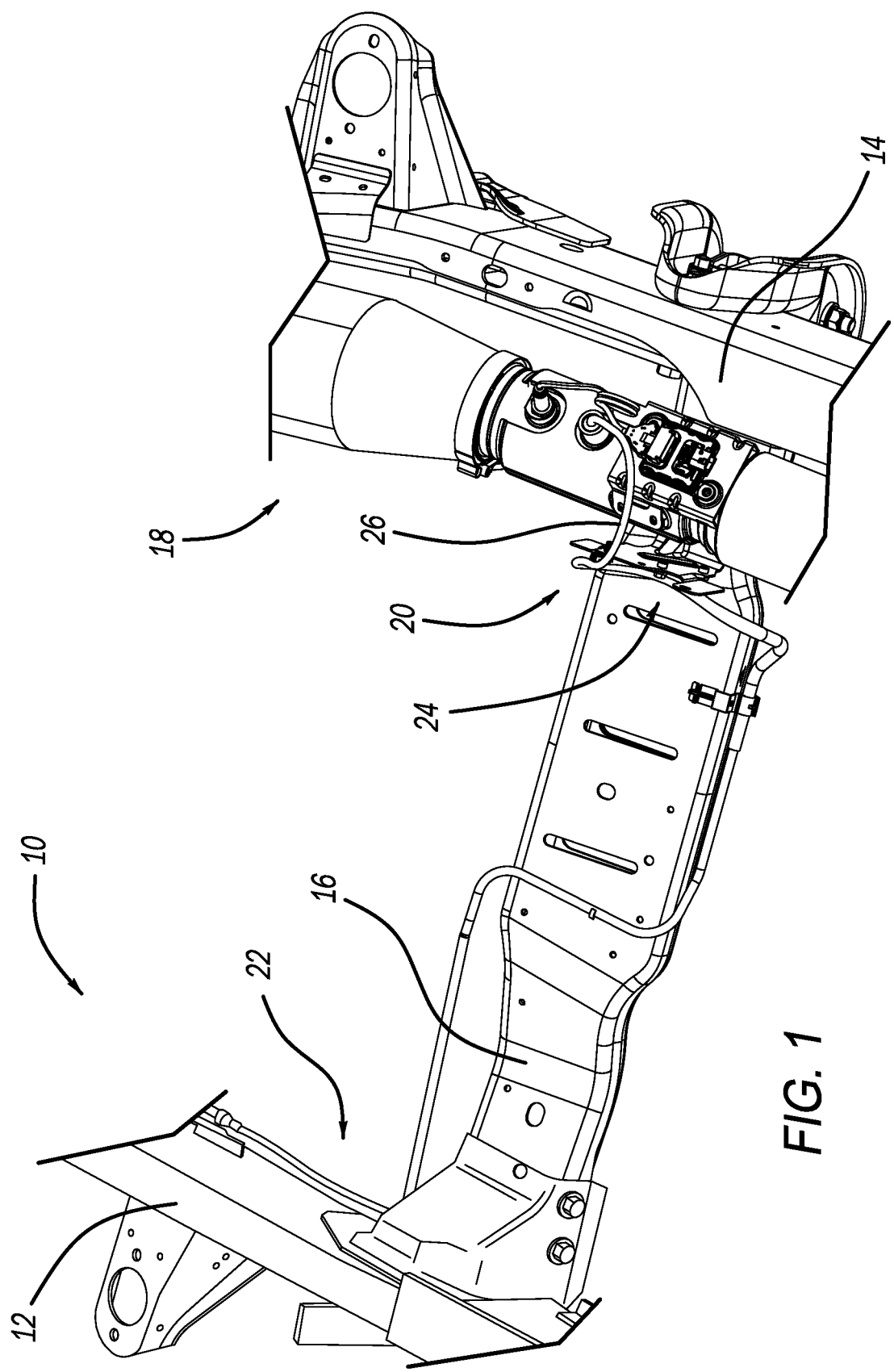
FIG. 1 is a schematic view of a dozer valve bracket on a vehicle frame.
Figure 2:
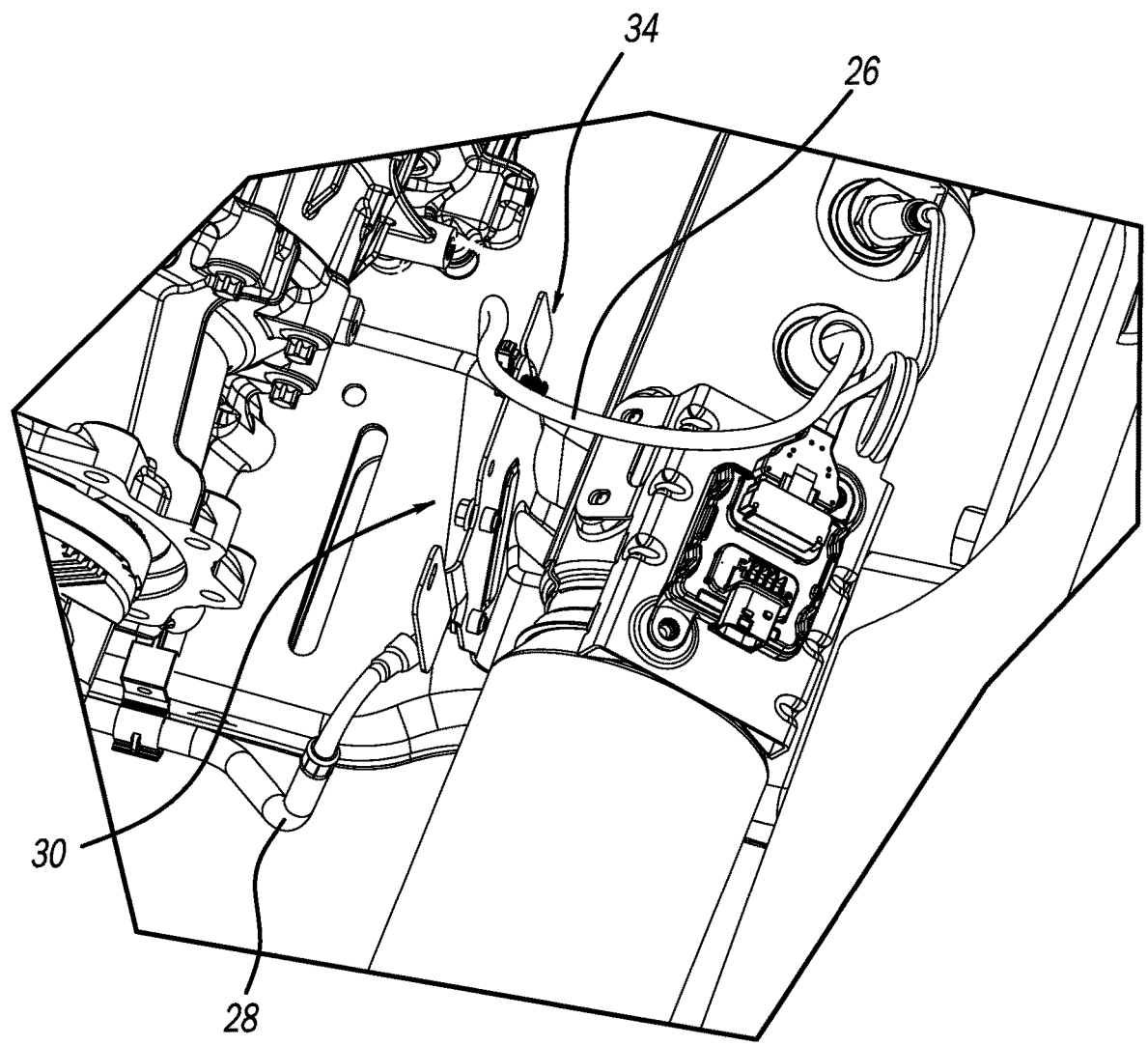
FIG. 2 is a schematic view of the dozer valve on a vehicle frame with the exhaust attached.
Figure 3:
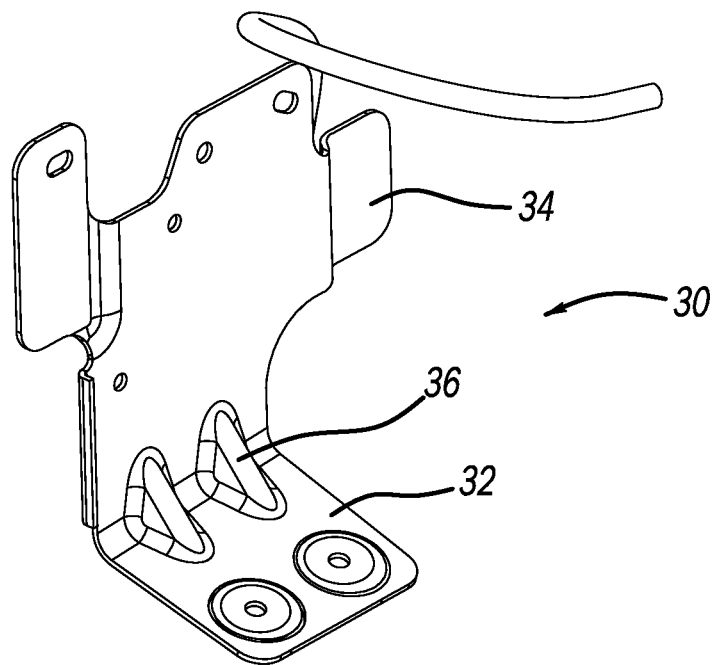
FIG. 3 is a perspective view of a dozer valve bracket.
Figure 4:
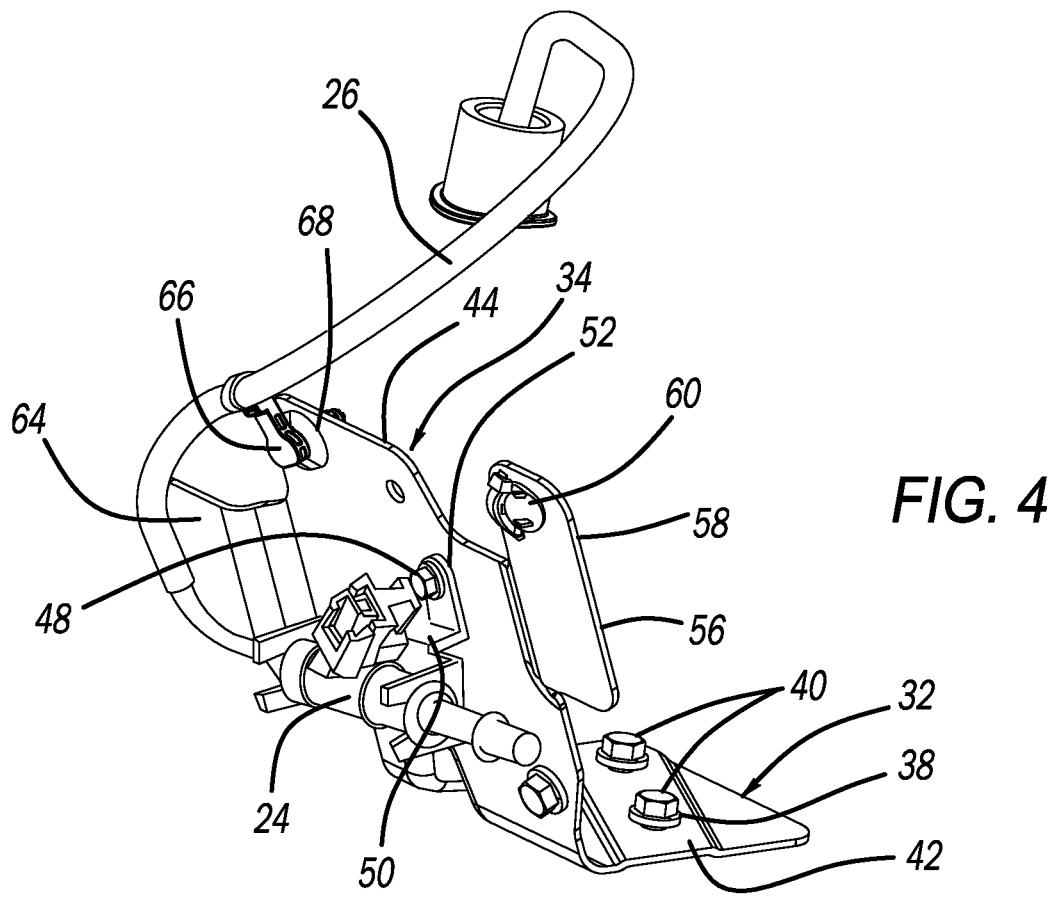
FIG. 4 is a perspective view of the dozer valve bracket.

Example embodiments will now be described more fully with reference to the accompanying drawings.

Turning to the figures, a vehicle frame is illustrated and designated with the reference numeral 10. The frame 10 generally includes side beams 12, 14 and a cross rail 16. An exhaust system 18 is positioned onto the frame 10. The exhaust system 18 has a desired number of components and is positioned onto the frame 10 by moving vertically generally from above the frame downward to be secured with the frame 10. The dozer bracket 20 is secured to the cross rail 16. A fuel line system 22 is illustrated from a fuel valve to the dozer valve 24. Also, a flex line 26 extends from the outlet of the dozer valve 24 to the exhaust system 18. The flex line 26 is generally fixed at 280 mm long, limiting the space to package the dozer valve within the vehicle envelope. Additionally, the dozer valve includes a low voltage wiring harness 28 that is connected with the dozer valve to provide signals for operation of the valve.

A dozer valve bracket 30 includes a first portion 32 and a second portion 34. A reinforcement member 36 is positioned between the first and second portions 32, 34. The first portion 32 generally includes a pair of apertures 38 to receive fasteners 40 to secure the bracket 30 with the cross-member 16. Ordinarily, a raised support 42 provides reinforcement in the first bracket portion to receive the fasteners 40. The support 42 is illustrated as circular, however, there are many geometries that could be utilized.

The first bracket portion 32 is positioned underneath of the exhaust 18 after assembly of the exhaust with the frame 10. Thus, the connection of the bracket with the cross-member 16 is inaccessible with the exhaust 18 in position. Accordingly, the bracket 30 is secured with the cross-member 16 prior to assembly of the cross-member with the side beams 12, 14. Thus, the bracket 30 is added during the assembly of the frame 10.

The second portion 34 extends substantially perpendicular to the first portion 32. The second portion includes a wall 44 that receives the dozer valve 24. The dozer valve 24 is secured to the wall 44 via fasteners 48 securing the valve holder 50 with the second bracket portion 34. The wall 44 includes apertures 52 that are positioned on the wall 44 that position the dozer valve at an angle of approximately 15° with respect to horizontal. This provides that the valve inlet is positioned, with respect to horizontal, higher than the outlet.

A heat shield 56 is coupled with the wall 44. The heat shield 56 protects the valve 46 for aerothermal heat from the hot end of the exhaust. The shield 56 also acts to protect the fragile hydrocarbon valve 24 itself from damage. An aperture 58, on the heat shield 56, receives a wiring clip 60 to retain the low voltage wiring harness that is required to provide power to the valve 24. Also, the heat shield 56 is offset with respect to the wall 44.

A flex line support 64 is offset with respect to the wall 44. The support 64 abuts the flex line 26 to hold it in position with respect to the bracket 30. Also, a flex line clip 66 is positioned in an aperture 68 on the wall 44 to provide an additional support for the flex line 26 to prohibit the flex line 26 from sagging to maintain the flex line 26 above the exhaust system 18.

Fuel is transferred from fuel system via the fuel line 22 to the dozer valve 24. The fuel, via the outlet of the dozer valve 24, is passed via the flex line 26 into the exhaust system 18. Thus, when the exhaust system requires the dozer valve to doze off the exhaust to clean it from soot every 24 hours of drive time, the fuel is passed from the fuel tank to the dozer valve and, in turn, via the flex line 26 into the exhaust system 18.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A dozer valve bracket comprising:
   a first bracket portion for securing to a frame cross member, the first bracket portion including a fastener receiver to enable passage of a fastener;
   a second bracket portion is spaced from the fastener receiver and extends substantially transverse to and from the first bracket portion, the second bracket including a valve retention member for positioning the valve at a desired angle on the second bracket portion;
   a heat shield coupled with the second bracket portion for protecting the valve from heat generated by an exhaust system; and
   a flex line support for positioning the flex line away from the exhaust system.

2. The dozer valve bracket of claim 1, wherein, during use, the first bracket portion is covered by the exhaust system.

3. The dozer valve bracket of claim 1, further comprising a wall defining the second bracket portion and the valve retention member.

4. The dozer valve bracket of claim 3, wherein the heat shield is offset from the valve retention member.

5. The dozer valve bracket of claim 3, wherein the flex line support is offset from the valve retention member.

6. The dozer valve bracket of claim 1, wherein a wire harness support is coupled with the heat shield.

7. The dozer valve bracket of claim 1, wherein a reinforcement member is between the first and second bracket portions.

8. A dozer valve and bracket comprising:
   a dozer valve;
   a first bracket portion for securing to a frame cross member, the first bracket portion including a fastener receiver to enable passage of a fastener;
   a second bracket portion is spaced from the fastener receiver and extends substantially transverse to and from the first bracket portion, the second bracket including a valve retention member for positioning the valve at a desired angle on the second bracket portion;
   a heat shield coupled with the second bracket portion for protecting the valve from heat generated by an exhaust system; and
   a flex line support for positioning the flex line away from the exhaust system.

9. The dozer valve bracket of claim 8, wherein, during use, the first bracket portion is covered by the exhaust system.

10. The dozer valve bracket of claim 8, further comprising a wall defining the second bracket portion and the valve detention member.

11. The dozer valve bracket of claim 10, wherein the heat shield is offset from the valve retention member.

12. The dozer valve bracket of claim 10, wherein the flex line support is offset from the valve retention member.

13. The dozer valve bracket of claim 8, wherein a wire support is coupled with the heat shield.

14. The dozer valve bracket of claim 8, wherein a reinforcement member is between the first and second bracket portions.

* * * * *